United States Patent
Goodman et al.

(10) Patent No.: US 12,506,725 B2
(45) Date of Patent: Dec. 23, 2025

(54) CONTROL-PLANE PROTOCOL FOR ISOLATED OR DISCONNECTED ENVIRONMENTS OF AN INFORMATION HANDLING SYSTEM

(71) Applicant: Dell Products L.P., Round Rock, TX (US)

(72) Inventors: Bradley Goodman, Nashua, NH (US); Kirk Hutchinson, Londonderry, NH (US); Anurag Sharma, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 17/724,880

(22) Filed: Apr. 20, 2022

(65) Prior Publication Data
US 2023/0344819 A1  Oct. 26, 2023

(51) Int. Cl.
*H04L 9/40* (2022.01)

(52) U.S. Cl.
CPC ...... *H04L 63/0823* (2013.01); *H04L 63/0442* (2013.01); *H04L 63/102* (2013.01); *H04L 63/105* (2013.01)

(58) Field of Classification Search
CPC ... G06F 16/2365; H04W 12/06; H04W 12/00; H04W 12/37; H04W 88/06;
(Continued)

(56) References Cited

U.S. PATENT DOCUMENTS 8,392,709 B1 * 3/2013 Agrawal ............... H04L 9/3228
                                                        713/169
10,122,615 B2  11/2018 Mahadevan et al.
(Continued)

FOREIGN PATENT DOCUMENTS

| CN | 104022896 A | * | 9/2014 | |
| CN | 107272462 A | * | 10/2017 | ............ G05B 19/04 |

(Continued)

OTHER PUBLICATIONS

Cho, Joo Yeon, and Thomas Szyrkowiec. "Practical authentication and access control for software-defined networking over optical networks." Proceedings of the 2018 Workshop on Security in Softwarized Networks: Prospects and Challenges. 2018. (Year: 2018).*

(Continued)

*Primary Examiner* — Michael Simitoski
(74) *Attorney, Agent, or Firm* — Larson Newman, LLP

(57) ABSTRACT

An information handling system of a multiple node environment includes a memory and a processor. The memory stores one or more variables associated with a state of the information handling system. The processor receives a cryptographically signed message. A source of the cryptographically signed message is considered as an untrusted source within the multiple node environment. The processor verifies the cryptographically signed message as an authoritative message. In response to the cryptographically signed message being verified as an authoritative message, the processor determines the state described in the cryptographically signed message matches the state of the information handling system stored in the memory. In response to the state described within the cryptographically signed message matches a current system state, the processor executes a request associated with the cryptographically signed message.

20 Claims, 6 Drawing Sheets

(58) Field of Classification Search
CPC ......... H04L 9/3247; H04L 9/32; H04L 67/55; H04L 67/10; H04L 63/08; H04L 63/10; H04L 63/20

See application file for complete search history.

(56) References Cited

U.S. PATENT DOCUMENTS

| | | | |
|---|---|---|---|
| 10,158,709 B1* | 12/2018 | Muniswamy-Reddy | G06F 16/252 |
| 11,552,803 B1 | 1/2023 | Simkhada | G06F 21/73 |
| 2005/0289347 A1* | 12/2005 | Ovadia | H04L 9/3247 |
| | | | 713/171 |
| 2007/0255861 A1* | 11/2007 | Kain | H04L 63/029 |
| | | | 710/8 |
| 2008/0187136 A1* | 8/2008 | Zhang | H04L 1/1812 |
| | | | 380/279 |
| 2009/0319761 A1* | 12/2009 | Bostanci | G06F 9/30181 |
| | | | 712/E9.035 |
| 2010/0077390 A1* | 3/2010 | Nicoulin | H04N 21/443 |
| | | | 717/171 |
| 2014/0047513 A1* | 2/2014 | van 't Noordende | G06F 21/604 |
| | | | 726/4 |
| 2014/0298040 A1* | 10/2014 | Ignatchenko | G06F 21/575 |
| | | | 713/192 |
| 2017/0093664 A1* | 3/2017 | Lynam | H04L 41/0631 |
| 2017/0093922 A1* | 3/2017 | Duan | H04L 67/75 |
| 2017/0156076 A1* | 6/2017 | Eom | H04W 24/10 |
| 2017/0373945 A1* | 12/2017 | Chrysanthakopoulos | G06F 16/23 |
| 2019/0238555 A1* | 8/2019 | Buffard | G06F 21/57 |
| 2021/0112020 A1 | 4/2021 | Radhakhrishnan | |
| 2021/0152467 A1* | 5/2021 | Nallapareddy | H04L 45/44 |
| 2022/0263805 A1* | 8/2022 | Ray | H04L 69/162 |
| 2022/0263819 A1* | 8/2022 | Kim | H02J 7/00045 |
| 2022/0329628 A1* | 10/2022 | Zayats | H04L 63/20 |
| 2023/0336488 A1* | 10/2023 | Li | H04L 67/12 |
| 2023/0370440 A1* | 11/2023 | Oliver | H04L 9/3228 |

FOREIGN PATENT DOCUMENTS

| | | | | |
|---|---|---|---|---|
| EP | 4336433 A1 * | 3/2024 | | G06F 21/604 |
| WO | WO-2021115554 A1 * | 6/2021 | | |

OTHER PUBLICATIONS

Palmieri, Francesco, and Ugo Fiore. "Securing the MPLS control plane." High Performance Computing and Communications: First International Conference, HPCC 2005, Sorrento, Italy, Sep. 21-23, 2005. Proceedings 1. Springer Berlin Heidelberg, 2005. (Year: 2005).*

Li, Cheng-min et al. CN 107272462 A (machine translation), published Oct. 20, 2017. (Year: 2017).*

Wang, You-liang. CN 104022896 A (machine translation), published Sep. 3, 2014. (Year: 2014).*

* cited by examiner

CONTROL-PLANE PROTOCOL FOR ISOLATED OR DISCONNECTED ENVIRONMENTS OF AN INFORMATION HANDLING SYSTEM

FIELD OF THE DISCLOSURE

The present disclosure generally relates to information handling systems, and more particularly relates to a control-plane protocol for isolated or disconnected environments of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system of a multiple node environment includes a memory and a processor. The processor may receive a cryptographically signed message. A source of the cryptographically signed message may be considered as an untrusted source within the multiple node environment. The processor may verify the cryptographically signed message as an authoritative message. In response to the cryptographically signed message being verified as an authoritative message, the processor may determine whether a state of the cryptographically signed message matches a state of the information handling system and validate the state of the cryptographically signed message based on the state of message matching the state the information handling system. In response to the state being validated, the processor may execute a request associated with the cryptographically signed message.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
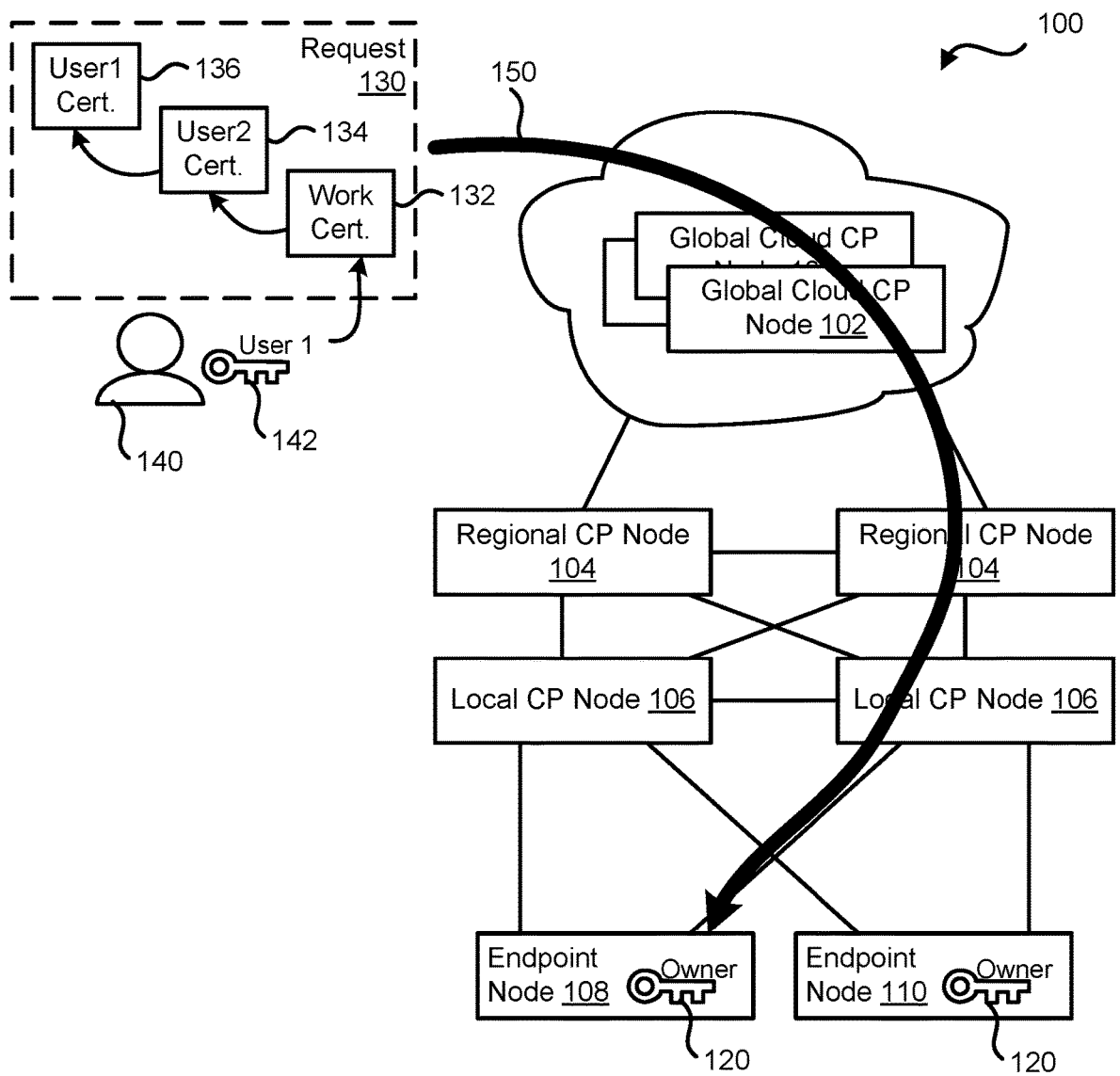
FIG. 1 is a block diagram of a multiple node environment according to at least one embodiment of the present disclosure.

FIG. 1 illustrates a multiple node environment 100 according to at least one embodiment of the present disclosure. Multiple node environment 100 includes global cloud control-plane (CP) nodes 102, regional CP nodes 104, local CP nodes 106, and endpoint nodes 108. In an example, global CP nodes 102, regional CP nodes 104, local CP nodes 106, and endpoint nodes 108 may be any suitable information handling systems, such as substantially similar to information handling system 600 of FIG. 6. Multiple node environment 100 may include any suitable number of global CP nodes 102, regional CP nodes 104, local CP nodes 106, and endpoint nodes 108 without varying from the scope of this disclosure.

In certain examples, multiple node environment 100 may be an isolated, disconnected, or disaggregated environment. As used herein, an isolated, disconnected, or disaggregated environment may include an environment with CPs that expand beyond a simple rack or datacenter, beyond a highly available cloud service, or the like. For example, an isolated, disconnected, or disaggregated environment may expand to devices beyond buildings, vessels, cities, continents, the edges of the planet, or the like. In an example, the further the CPs expand the more disaggregated the entire environment or topology becomes, including the CP itself. As such, the communication links or paths illustrated between the nodes of multiple node environment 100 may cover any suitable distance.

In an example, multiple node environment 100 may be disaggregated when the multiple node environment has one or more of the any suitable characteristics. For example, characteristics of a disaggregated multiple node environment 100 may include, but are not limited to, no defined hierarchy of authority, information may flow in any direction, information may originate from any point or node within the environment, topologies of the environment may be large, and connectivity between nodes may be bad, intermittent, or questionable or any suitable reason. For example, connectivity may be bad, intermittent, or questionable because of connectivity issues, limitations, problems or costs at remotes sites or nodes, such as endpoint nodes 108 and 110. Connectivity may be bad, intermittent, or questionable by design due to security concerns, such as a desire to keep machines, such as endpoint nodes 108 and 110, offline or hidden. Connectivity may be bad, intermittent, or questionable because of the mere scale of multiple node environment 100. For example, the larger or more nodes within multiple node environment 100, the greater the odds of something being wrong at a given point-in-time.

Additionally, a disaggregated multiple node environment 100 may have no defined hierarchy of authority between nodes 102, 104, 106, and 108. In this situation, no specific node may be 'in-charge' or hold any 'authoritative' piece of information. In a particular situation, if a node is 'in-charge' or 'authoritative', it may not be clear as to the node that is authoritative. For example, one control plane could serve different entities, such as plants, divisions, tenants, or companies, and each entity may have its own concept of 'authority'. In an example, these authorities may be centered around different places on a topology.

In certain examples, information may flow in any direction in multiple node environment 100, and the information may provide different purposes. For example, some of the information may be provided for certificate or other data replication purposes, some of the information may be provided for command/control/response purposes, or the like. In an example, information may originate from any node 102, 104, 106, 108, or 110 within multiple node environment 100. In certain examples, not all data is replicated in all nodes 102, 104, 106, 108, and 110. Additionally, data that is replicated in all nodes 102, 104, 106, 108, and 110 may not be considered to be consistent among all of the nodes. In fact, the replicated data may be inconsistency more than it is consistent among nodes 102, 104, 106, 108, and 110 based on a topology of multiple node environment 100.

In an example, multiple node environment 100 may include different topologies, such as an 'east/west' or peer nodes topology, 'north/south' or hierarchy nodes topology nodes, or the like. Peer nodes, such as regional nodes 104 or local CP nodes 106, may generally share data and work closely together for availability purposes within multiple node environment 100. In topologies between hierarchy nodes, such as one regional node 104 and a local CP node 106, the regional node may be responsible for overall management of a region, and the local CP node may be responsible for more day-to-day operations of a specific site. Topologies may be large, complex.

In previous disaggregated systems with a control plane protocol that relies on any given network connectivity method may not work at all for the disaggregated system or multiple node environment. In these previous disaggregated systems, all nodes of a large control plane may never be able to properly reconcile the state of all nodes, all the time. Additionally, in these previous disaggregated systems, conflicts may arise when control nodes having an equal authoritative level, but different information, generate two paradoxical or contradictory requests. In these previous disaggregated systems, conflicts may increase when disconnect nodes may cause delays in the conveyance of requests.

These problems or issues of previous disaggregated systems may become problematic in very large and distributed control planes with many hierarchies, with imperfect connectivity characteristics. As stated above, the imperfect connectivity characteristics may occur for many reasons. For example, endpoints may be isolated in remote areas with poor, expensive, slow, intermittent, or non-existent network connectivity. Endpoints may be in facilities with nearby control-plane nodes, but the entire facility may be poorly connected to, or disconnected from the rest of the hierarchy of the disaggregated system. Endpoints, facilities, or sections of the overall topology may be disconnected or segregated from the network for security purposes. The network segregation, such as in the case of security, may take on many forms, including, but not limited to, completely 'dark' or disconnected sites, and air-gapped sites that have limited physical connectivity. For example, an endpoint may have no ability to directly reach outside servers but may have the ability to reach other internal servers who do. Additionally, restricted sites may have some but limited connectivity, using firewall rules or other similar restrictions.

In these previous disaggregated systems, a control plane may define a well-known protocol by which endpoints and CP nodes connect and communicate to one-another via a network. The often-used standard network protocols may imply a certain level of connectivity. Thus, these previous control plane protocols may be generally predicated on network protocols that may assume a great deal of connectivity. For example, TCP/IP network protocol may assume a network connection to be two-way, with a finite expected response time from when a packet is sent. If no such response is received, the connection is deemed bad, and the protocol stops. In previous multiple node environments, control plane protocols may not only be built on top of such protocols, but also have the same general flow, such as the communication is two-way with an assumption of a connection, and a conversation, reconciliation or query of state, or the like.

Multiple node environment 100 and nodes 102, 104, 106, 108, and 110 may be improved via the operations described herein. For example, the control plane of multiple node environment 100 may be decentralized, which may improve communication between nodes of broken, fragmented, or isolated control networks by decoupling network protocols, such as the network protocol described above. In an example, use of stateful, Idempotent, messaging to build a control plane to control and coordinate requests may improve disaggregated multiple node environment 100. For example, the control plane multiple node environment 100 described herein may allow for message detection and resolution of conflicting requests over poorly, intermittently, or non-connected networks. In multiple node environment 100 messaging may be highly unidirectional but may also allow operation under conditions where back-and-forth communication may be possible.

During operation of nodes 102, 104, 106, 108, and 110 of multiple node environment 100, a control plane of the multiple node environment may decouple the conveyance of messages from the act, authority, or recognition, by the nodes involved with their delivery. The control plane may also allow for a multitude of ways that both control messages and metadata may be delivered to either endpoint 108 or 110 or other nodes 102, 104, and 106 within the control plane, while retaining security. In an example, the metadata may be any suitable data to improve communication with multiple node environment 100, such as roles, permissions, authorization, or the like. In certain examples, the control plane of multiple node environment 100 may include any suitable number of CP nodes 102, 104, and 106.

In an example, a request 130 may be provided from one node of multiple node environment 100 to another node. In an example, the message for request 130 may be in any suitable format including, but not limited to, JSON, XML, YAML, and CBOR format. Request 130 may include or consist of any suitable parts or operations. For example, request 130 may include a state or condition being modified as will be described in more detail below. Request 130 may also include a resource or object being acted upon, such as endpoint node 108. Request 130 may further include a command or request, and command or request-specific parameters/data/payload. Request 130 may also include authorization for the commands to be performed.

In certain examples, request 130 may be self-authenticating, such that operations within the request may be performed with the receiving node needing to verify the source of the message. For example, request 130 may include any suitable number of certificates, such as a work certificate 132, a second user certificate 134, and a first user certificate 136. In certain examples, authentication of one certificate can be based on a signature associated with another certificate having the rights or permissions. For example, a user 140 may create work certificate 132 with a signature of second user key 142, which may grant the work certificate 132 the permissions of second user certificate 134. Additionally, second user certificate 134 may include a first user signature key, which may grant the second user certificate with the permissions granted under first user certificate 136. First user certificate 136 may include an owner signature key, which may grant specific permissions to the first user from an owner.

As used herein, a certificate generally may be a document which is cryptographically signed by a known entity and may attest trust or identity of another person/user/role based on an identification of some public key. In an example, a certificate may only be recognized as good if signed by a trusted user. However, if a trusted user issues a certificate conveying trust in another user, the certificate may confer additional trust in that user. The passing or linking of certificates may be referred to as certificate chains, or chains of trust. Certificates may be an example of information that may need to be transmitted or synchronized between CP nodes 102, 104, and 106. Previous control systems would put trust and access policies in databases which are difficult to synchronize in a disaggregate environment. Thus, multiple node environment 100 may be improved by using certificates to convey trust and permissions that merely requires such certificates to be copied amongst different places or nodes, such as nodes 102, 104, 106, 108, and 110. In an example, nodes 102, 104, 106, 108, and 110 holding certificates may then add the certificates to and manage their own databases for simplicity.

As used herein, keys may use Public/Private keypairs in asymmetric encryption to establish methods for validating the authenticity of message or sending secrets. Private keys may be kept and held privately and may be used to assert that something was generated by the key holder. Public keys on the other hand may be utilized for public use to validate that something was approved by the holder of the associated private key. In an example, a certificate associated with a user and public key that is signed by a known, trusted entity may then attest that any message signed with that public key indeed came from that user.

In certain examples, request 130 may be provided to endpoint node 108 or 110 via any suitable manner. For example, request 130 may be cryptographically signed and transmitted along communication path 150 illustrated in FIG. 1. Request 130 may be signed by a trusted user. Nodes 102, 104, 106, 108, and 110 may convey messages to other nodes to make requests. The reception node may be endpoint node 108 or 110, or other control plane nodes 102, 104, or 106. Request 130 signed by a trusted user would be deemed valid and handled accordingly. While communication path 150 is shown traversing global cloud CP nodes 102, one regional CP node 104, one local CP node 106, to endpoint node 108, the request may be received by the endpoint node in any suitable manner. For example, cryptographically signed message may be used to convey request 130, and the message may be pulled by endpoint 108 from a source or pushed to the endpoint.

In an example, the request 130 may be pulled by endpoint 108 via any suitable manner including, but not limited to, the endpoint node establishing a connection to a well-known node. Request 130 may be pushed to endpoint node 108 via one or a combination of multiple suitable manners. For example, request 130 may be a file uploaded to endpoint node 108 from an external device, such as a USB drive. Request 130 may be sent to endpoint node 108 via messaging from a radio transmission or other modems, and via message from a short-range wireless transmission, such as Bluetooth, BLE, RFID, Zigbee, LoRa or the like. Additionally, request 130 may be sent to endpoint node 108 via a general-purpose network protocol, such as HTTP, HTTPS, MQTT, or the like, via a purpose-built network protocol made specifically for the control plane of multiple node environment 100. Request 130 may also be sent to endpoint node 108 via an electronic mail message, scanned from a humanly readable document via optical character recognition, and scanned from an optically encoded media, such as QR or barcodes as shown in FIG. 2.

Figure 2:
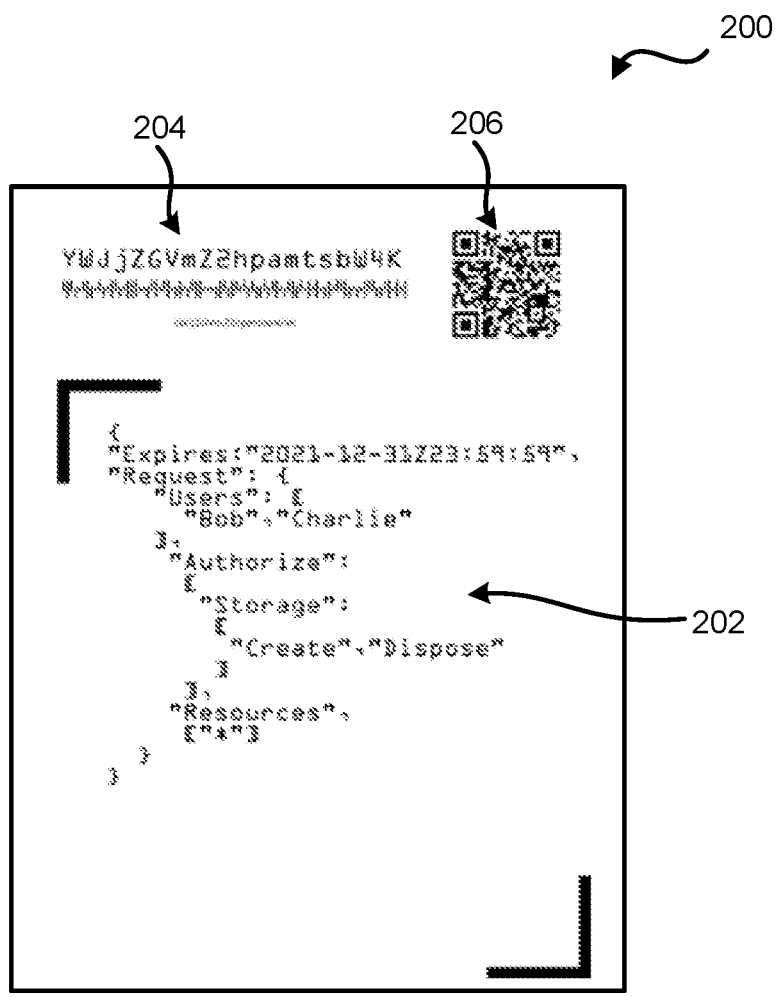
FIG. 2 is a diagram of an exemplary request for a node of the multiple node environment according to at least one embodiment of the present disclosure.

FIG. 2 illustrates an exemplary request message 200 for a node of multiple node environment 100 of FIG. 1 according to at least one embodiment of the present disclosure. In an example, request message 200 may be substantially similar to request message 130 of FIG. 1. Request message 200 includes a request payload 202, a checksum 204, and a signature 206. In an example, request message 200 may be a humanly readable document. In certain examples, the request message 200 may be scanned or snapped by a camera of an endpoint node, such as endpoint node 108 or 110 of FIG. 1. In an example, request message 200 may be scanned or snapped by a camera via suitable manner, such as Optical Character Recognition.

In certain examples, request payload 202 may include any suitable operations for an information handling system or node to perform. For example, the operations may include, but are not limited to, verifying whether request payload 202 is stateful and, if so, executing operations within the remainder of request payload 202. Checksum 204 and signature 206 may be optically encoded media within request message 200, such as QR codes, barcodes, or the like. In an example, a node may utilize checksum 204 and signature 206 to determine whether request message 200 is an authoritative message before request payload 202 is executed within the node.

Referring back to FIG. 1, when request 130 is received at endpoint node 108, the authority of certificates 132, 134, and 136 may be verified by public owner key 120 stored within the endpoint node. In this situation, the communication of a control plane is not defined by the network protocol, but by the secure messages, such as request 130, transmitted through multiple node environment 100. As described above, request 130 itself may be cryptographically verifiable to be authoritative. In this example, no trust is placed in whatever media or transmission protocol is used to convey such request 130. In an example, the self-authenticating request 130 may be conveyed via systems which incur long delays, such as manual or human courier, deep-space radio links, or the like. In this example, there may be no concept of a 'connection' to a finite node or set thereof.

As used herein, requests may be largely unidirectional in nature and don't inherently demand a response. For example, in placing request 130 on a USB key for later use would not necessarily result in an expected response. However, this example, does not preclude the ability for a message to convey a response. For example, a request conveyed over a network could return a result or error message. Furthermore, even request 130 on a device, such as a USB driver, may request information from endpoint 108, and the information may be compiled and written back to the USB drive in return.

In an example, nodes 102, 104, and 106 of a control plane may perform certain operations when the CP node knows who to trust. In this example, nodes 102, 104, 106, 108, and 110 need different certificates to establish trust. In certain examples, a 'Root CA' certificate in a web browser may be explicitly trusted and may be considered 'baseline' certificates. These baseline certificates may be initially loaded in a node may identify trusted messages signed with those public keys. In an example, intermediate certificates may not be explicitly trusted but may be implicitly trusted if signed by another trusted certificate, such as a Root certificate, an intermediate certificate which is already deemed trustworthy, or the like.

In certain examples, nodes 102, 104, 106, 108, and 110 may convey more than messages including, but not limited to, intermediate certificates. In an example, the intermediate certificates may be cryptographically signed by a trusted entity so that endpoints 108 and 110 may trust the certificate, and any conveyance of trust in states. Additionally, a certificate may covey trust in request 130 when the certificate includes a public key associated with a particular user/role. Therefore, any key or message signed with that public key, can too be verified and trustworthy.

The control plane of multiple node environment 100 may securely convey replicated messages and certificates and convey public keys through the entirety and hierarchy of the control plane, without any security or trust in the communication media itself. In an example, certificates, which may grant permissions, and keys may be made asymmetric and available in different nodes. The storage of certificates in different nodes may allow protection within multiple node environment 100 via isolation of the nodes. In different examples, the isolation of certificates may be performed within multiple node environment 100 may be for any suitable reason including, but not limited to, security, such as hiding authorizations, and for practicality of not keeping certificates in nodes or places where certificates are not needed. In an example, encryption keys may be stored in a memory of endpoint node 108 or 110 and applied offline. For example, endpoint node 108 or 110 may sign a certificate within an offline system and move or transmit only certificates signed by the particular node to online systems. In an example, request 130 to do work may be conveyed through offline manners, in disconnected or poorly connected systems for systems which are kept dark for security purposes. Request 130 to do work may be conveyed through offline manners, in disconnected or poorly connected systems for systems which are dark due to connectivity problems.

During operation of a node, user 140 may utilize the node as a requestor node to generate request 130. In response to request 130 being transmitted along communication path 150 to endpoint node 108, the endpoint node may parse and validate the request. If request 130 is valid, endpoint node 108 may execute the request, and may optionally return some sort of result, value, error, or data in a response message. In an example, request 130 must be expressed in a stateful manner, so that endpoint 108 may validate a proper state before execution. In certain examples, there may be one or more pieces of state, and they are all expressed in a from and to manner. If request 130 has multiple state expressions, the states may be treated as atomic. As used herein, atomic states for request 130 must all pass or the request fails.

In an example, not all requests need to modify the state. For example, request 130 may predicate itself on state, such as confirm a condition. In this example, request 130 may predicate itself on state by the request causing endpoint node 108 to check that the request is happening in some definitive timeframe. The statefulness of request 130 to ensure that the request is happening in some definitive timeframe may be referred to as the lifespan of the request. In the example above, the lifespan statefulness of request 130 may be to confirm a time condition may be predicated on itself, because the state of the request could not alter the time in endpoint node 108.

In certain examples, there may be multiple critical concepts in the construction of stateful construction of particular importance in a disaggregated system, such as multiple node environment 100. For example, a user at a particular node may think he/she knows an existing state of a node or component, such as endpoint node 108, but the user may not know or understand the state. Additionally, request 130 from user 140 may be delayed or preempted by another request that may change the state of endpoint node 108. For example, request 130 may include one or more operations to change a firmware version of endpoint node 108 from version 2 to version 3. However, another or second request from another user may include one or more operations to change the firmware version of endpoint 108 from version 2 to version 2.1. In this situation, if the second request is received at endpoint 108 first, the statefulness of the request may be verified based on the version of the firmware being version 2. In this situation, endpoint 108 may perform the operations of the second request and update the firmware from version 2 to version 2.1. If request 130 is then received after the completion of the firmware version to version 2.1, endpoint node 108 may determine the statefulness of the request. Based on the statefulness determination, endpoint node 108 may determine that request 130 must fail because the request is not stateful. In this example, request 130 may not be stateful because the current firmware version of endpoint node 108 is version 2.1 not version 2 as required by request 130.

In an example, a piece of state may be a value of an item. For example, the state may be an explicit definition, such as an endpoint-specific global or environmental variable. In another example, the state or value may be the result of a function or procedure, such as an amount of time a node has been up. The state or value may also be an attribute of an object, such as a version number of an object, a hash of a data blob, or the like.

In certain examples, the implementation of a control plane within multiple node environment 100, such as exact messages, operations, permissible functions and rules for any given message or operation, may be up to the implementor of the multiple node environment. For example, flexibility as a framework for the control plane to accommodate varying situations may be a substantial improvement within multiple node environment 100. In an example, the control plane, such as one of CP nodes 102, 104, or 106, may receive a message and utilize one or more modules or operations to process request 130 as will be described with respect to FIG. 3.

Figure 3:
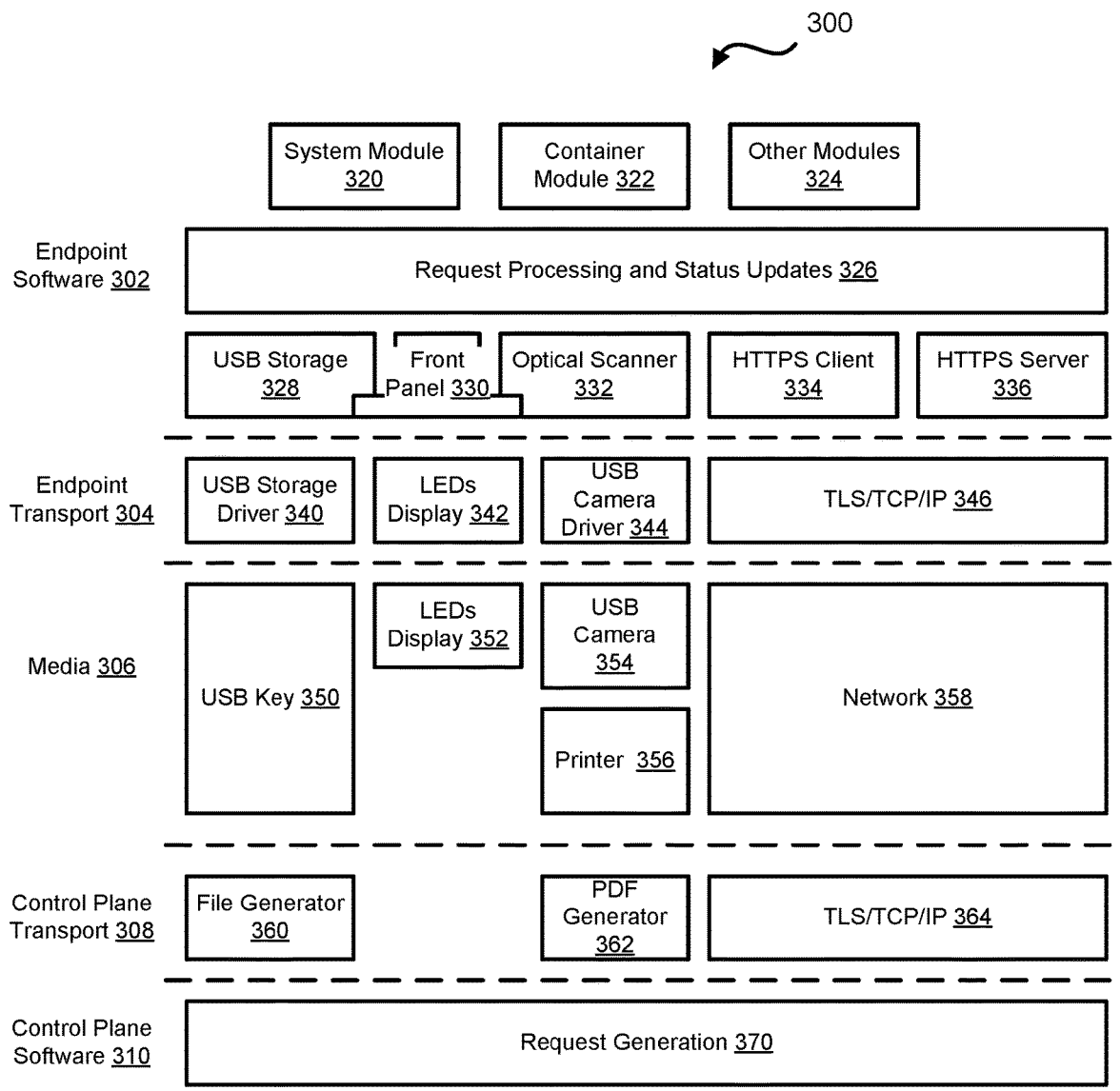
FIG. 3 is a diagram of media and transport mechanisms within the multiple node environment according to at least one embodiment of the present disclosure.

FIG. 3 illustrates media and transport mechanisms 300 within different nodes of a multiple node environment, such as multiple node environment 100 of FIG. 1, according to at least one embodiment of the present disclosure. Media and transport mechanisms 300 may include different devices, modules, protocols, or the like in endpoint software 302, endpoint transport mechanisms 304, media 306, control plane transport mechanisms 308, and control plane software 310. The software and mechanism described herein may be performed or implemented within a hardware device, such as a processor, an application specific integrated circuit (ASIC), or the like.

Endpoint software 302 may include a system module 320, a container module 322, other modules 324, a request processing and state update module 326, a USB storage 326, a front panel 330, an optical scanner 332, a HTTPS client 334, and an HTTPS server 336. Endpoint transport mechanisms 304 include a USB storage driver 340, LED display 342, USB camera driver 344 and transmission protocols 346. Media 306 includes USB keys 350, LED display 352, USB camera 354, a printer 356, and network 358. Control plane transport mechanisms 308 include a file generator 360, a PDF generator 362, and transmission protocols 364. Control plane software 310 includes a request generator 370. In certain examples, media and transport mechanisms 300 may include additional modules, components, transmission protocols, or the like without varying from the scope of this disclosure.

In an example, system module 320, container module 322, and other modules 326 may define an environment to describe state, conditions, and commands in a request, such as request 130 of FIG. 1. In certain examples, system module 320, container module 322, and other modules 326 may pieces of code which could be developed to a specific API to implement functions for the presentation and handing of objects in a system for request processing. Thus, the actual implementation of request processing 326 may be open to application-specific definition, and this may be done using system module 320, container module 322, and other modules 326 that define handling of system or application-specific requests.

In certain examples, system module 320, container module 322, and other modules 326 may have a hierarchy of objects under them, and each object may contain descendent objects. In an example, an object may contain parameters, which may be handled based on particular module instructions on how to read a parameter, to set a parameter, or the like. Additionally, objects may be issued actions or commands.

In an example, system module 320 of endpoint software 302 may define a parameter object called uptime. In this example, reading the uptime parameter may return the system uptime. However, this parameter may not be set. Additionally, system module 320 may create an action called reboot. If request generator 370 of control plane software 310 sends a request with a reboot command, the system module may cause or generate a system reboot. USB storage 328, front panel 330, optical scanner 332, HTTPS client 334, and HTTPS server 336 of endpoint software 302 may operate in any suitable manner known in the art and will not be described in detail herein. USB storage driver 340, LED display 342, USB camera driver 344, and transmission protocols 346 of endpoint transport 304 may operate in any suitable manner known in the art and will not be described in detail herein. USB device 350, LED display 352, USB camera 354, printer 356, and network 358 of media 306 may operate in any suitable manner known in the art and will not be described in detail herein. File generator 360, PDF generator 362, and transmission protocols 364 of control plane transport 308 may operate in any suitable manner known in the art and will not be described in detail herein.

In an example, one or more of modules 320, 322 and 324 may generate or place rules with respect to use of parameter reading/writing and actions. For example, certain parameters may be writable or not, certain parameters may require values expressed in specific formats, certain commands may require certain parameters to be set to appropriate values. In certain examples, objects of modules 320, 322 and 324 may also contain descendent objects. For example, if multiple node environment 100 of FIG. 1, may could run containerized workloads, endpoint node 108 of FIG. 1 may create a containers module. In this example, each workload may appear as an object under the containers module, such as job1, job2, or the like. In another example, namespace management may be improved by creating a job object under containers to reference the jobs, such as containers.jobs.job1, or the like.

In certain examples, each of the jobs may be objects, and the jobs may therefore have descendent objects, parameters, actions, or the like. Modules 320, 322, and 324 may define and interrogate parameters such as containers.jobs.job1.hash, which may be a hash of a workload request. Modules 320, 322, and 324 may also define object parameter comparators. However, if a comparator does not exist, a set of default system-level comparators may be used, such as equals or not equals, which would compare strings or integers. However, for non-obvious datatypes, modules 320, 322, and 324 may create and use a custom comparator. For example, if a date string expressed like '1/22/21' is received, a standard greater than operation may not be able to handle the date string or may improperly parse it as a text string. However, a custom greater than operator may intelligently process and compare it with another date value.

In an example, modules 320, 322, and 324 may also define object parameter validators. In this example, a validator may check that a given new value of an object is valid. For example, the validator may ensure that a parameter called quantity was in-fact an integer. The validator may also be more intelligent. For example, the validator may verify that a change of a specific setting for a given object was valid at this point in time. In an example, simple canned validators may be implemented by default for known datatypes like strings, integers, dates, etc.

In certain examples, objects in modules, such as modules 320, 322, and 324, may handle transactions in an endpoint, such as endpoint node 108 of FIG. 1. In these examples, when a new transaction object is created, changes to a parameter may be temporarily stored in the transaction object. After changed parameter values have been applied in a transaction object, a validate action handler of an object may be called. This handler may check whether the action may be performed within endpoint 108, with the parameters as changed in the transaction. In this example, the validate action handler may return an error if there is a problem with the parameters or configurations.

In an example, modules, such as modules 320, 322, and 324, may also include a commit handler, which may be used to commit all pending changes in a transaction to actual values within that object. In certain examples, module actions also may have an execute handler, which may perform the actual execution. In these examples, all attempts must be made to assure to the greatest possibility that this action can be performed, because during this phase of execute if one-in-a-sequence of actions fails, it may leave this resource in a failed state. Additionally, module actions may also have a rollback handler that may be used in the event that a subsequent execute statement in a sequence of more than one statements has failed. In this situation, the rollback handler may attempt to restore the state back to a previous or original value.

Referring back to FIG. 1, request 130 for endpoint node 108 may include one or more conditions or states for the endpoint before the operations of the request are performed. For example, request 130 may include if system.restarted from 70/11/21 08:05 am and if system currentDateTime is less than {current time+1 hours}, then perform action system.rebootNode. In an example, when endpoint node 108 receives such request 130 described above, the endpoint node may make sure that the request has not undergone any undue delays. Additionally, the state check, such as system-.restarted check, may indicate that if endpoint node 108 was already restarted or if another request was in the processes of dealing with this node the command would fail because the system.restarted check would fail. In an example, the failure of the state system.restarted may indicate that another user just rebooted endpoint node 108, but also may indicate simply that the control-path node from which the requestor generated this request had out of date information.

In the latter case, the requester, such as a node associated with user 140, may query newer information from endpoint node 108, then re-generate request 130. Based on an attempt to query for new information the requestor node may either be unable to query or be able to query. If the requestor node is unable to query, such as network or endpoint node 108 are down, the requestor node can still issue request 130 without knowing whether the request will work. If reason the query was not able to work was a simple network outage, and request 130 is delivered over the next hour the state of the request will pass. However, if query failed due to the fact that endpoint node 108 was rebooting the system.restarted check, the state of request 130 will fail when the endpoint node comes back online. If the requestor node is able to query, the query may indicate a different restart time for endpoint node 108. And if so, user 140 may then need to reconcile what request 130 really wanted or intended. Thus, in a stateful request 130, user 140 may be attesting something to be done predicated on some conditions being in-place. If those conditions are not met, user 140 may not be informed as to the current state of endpoint 108 and the state of the endpoint node should be resolve before continuing with request 130.

In certain examples, modules within endpoint node 108 may be free of any external synchronization or concurrence concerns. In these situations, if there are any restrictions or dependencies, it is up to the module of endpoint node 108 to provide proper synchronization. However, in extreme cases, a module of endpoint node 108 may declare itself to be exclusive, meaning the external framework will assure no other requests can be handled while in operation.

In an example, request 130 may include operations to update MyJob to the newest code or configuration. In this example, a last state of endpoint node 108 may be compared against request 130. For example, request 130 may include if containers.MyJob.blueprint.hash is 72345a . . . bsde, change containers.MyJob.blueprint.maxjobs from 100 to 200, change containers.Component from //mystore/myjob1.blob to //mystore/myjob2.blob, and restart containers.MyJob1. In this example, the two change operations not only specify the two actual items request 130 wants to change, but further verifies that the request knows the initial state of the items.

In response to request 130 above, endpoint node 108 may parse the request in any suitable manner. For example, a processor of endpoint node 108 may search the list of requests for any modules used. If any of the modules require global synchronization, endpoint node 108 may grab a global synchronization semaphore, such as a single-writer/multi-reader, for WRITE access, else hold for READ access. Endpoint node 108 may also perform any implementation-specific authentication and permissions verification. Endpoint node 108 may read all of the "if" requests in request 130, and verify each parameter mentioned by reading the specified parameter from the specific object and using a parameters comparison function of the specified module. If any parameter is different than stated or non-existent, endpoint node 108 may stop and return an error.

Endpoint node 108 may also read all the from values in any change statements and compare these values like in the "if" cases and fail accordingly. Endpoint node 108 may go through the change and any action statements and issue a begin update on each module. Endpoint node 108 may also go back through the change requests and call each object's validate handler with the 'to' part of each. If passed, the transaction may hold the desired new value of the parameter. If any validations fail, endpoint node 108 may return an error response. Endpoint node 108 may go through an action request and call the object validate action handler. The validate action handler may not only verify that the action is valid and executable, but that the action is valid with any of the changed parameters.

At this point, endpoint node 108 may determine that request 130 is valid and authorized. Endpoint node 108 may then call the commit update on each module, which may change the actual parameter values. However, if any failures happen, the changed states may reflect the changes. Endpoint node 108 may call an execute handler for each action, and the execute handler may perform the actions. If anyone of the actions fails, endpoint node 108 may attempt rollback in any succeeded actions, then return a failure response. Otherwise, endpoint node 108 may return a success response along with any data returned by the execution processes.

In certain examples, regardless of the transmission technique, multiple node environment 100 of FIG. 1 may have a requirement for issuance over nonstandard communication formats, and for messages to be able to withstand long communication delays. However, messages, such as request 130 of FIG. 1, may have a layered approach as in any device-driver architecture.

In certain examples, a request, such as request 130 of FIG. 1, may include a stateful representation of the message, which may be a request to perform particular operations. Additionally, a message can include much more data, which may be specific to the request. For example, a request to run a program could consist of parameters, environmental variables, even a URL where to fetch the program. In certain examples, the data may be implementation and per-message defined.

In an example, the implementation may enable the request to include a payload with a message. For example, a payload may be a binary blob consisting of a tarfile, RPM, executable, ZIP file, or the like with the contents of code to execute.

Any assurances as to correctness or authenticity must come from within the implementation, such as with the use of hashes or signatures.

Similarly, a response may also contain a payload. An example of a payload in a response may be a log file or collection from a system or application. In certain examples, any encryption or authentication in a request, such as request 130 of FIG. 1, may be implemented as defined in control plane or endpoint transport 308 or 304, or in modules 320, 322, or 324 of endpoint software 302.

In certain examples, packaging of a request or response may be very much an implementation-specific item. However, in some cases, such as network transmission, an agent may be capable of sequencing and/or serializing multiple requests, assuring that one is completed only after another. In an example, a request, such as request 130 of FIG. 1, for placing files on a USB device, multiple node environment 100 or endpoint 108 of FIG. 1 may allow multiple requests to be present. In this example, the implementation must be in charge of the specifics behind both packaging and sequencing. For example, a USB device implementation may allow only one, or multiple files to be present on a device. The implementation may allow or disallow rules around folders, hierarchies, filesystems, or the like. The implementation may allow multiple requests to be present in a single ZIP or tar file, and the requests may have different compression formats. The implementation may allow encryption of the request or data files. The implementation may have its own ordering rules, such as requests are processed alphabetically. The implementation may have rules around success, such as rules from any single file may be processed only up until a point where one request fails.

Figure 4:
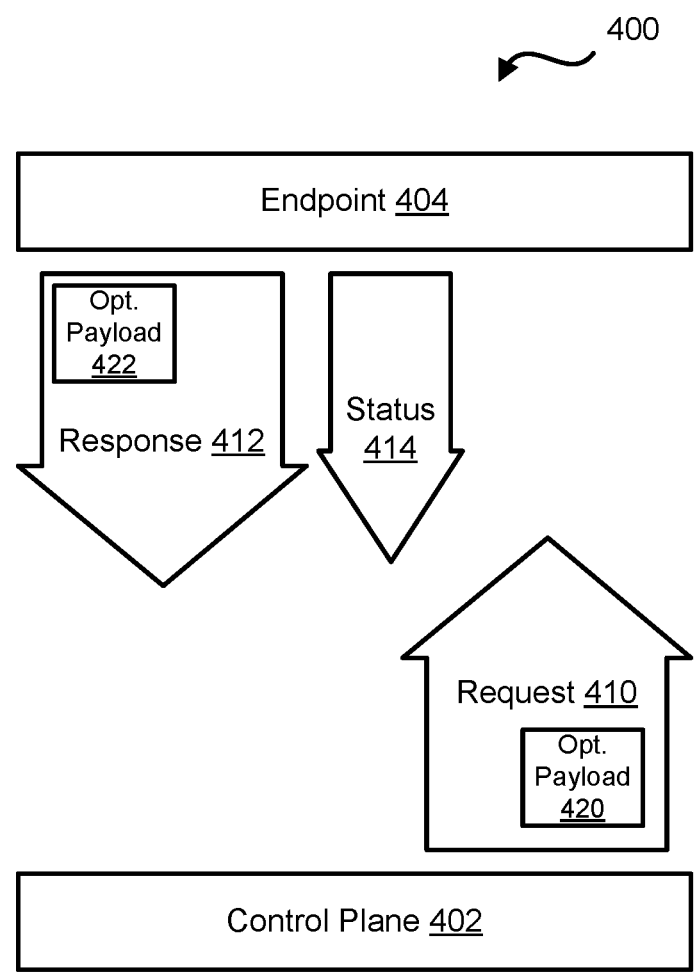
FIG. 4 is a block diagram showing communication between a control plane node and an endpoint node according to at least one embodiment of the present disclosure.

FIG. 4 illustrates communication between a control plane node 402 and an endpoint node 404 according to at least one embodiment of the present disclosure. Control plane node 402 may be substantially similar to CP nodes 102, 104, and 108 of FIG. 1. Endpoint node 404 may be substantially similar to endpoint nodes 108 and 110 of FIG. 1. Control plane node 402 may provide a request 410 to endpoint 404. In an example, request 410 may be substantially similar to request 130 of FIG. 1. Based on request 410, endpoint node 404 may provide one of or both of a response 412 and a status 414. In an example, request 410 may optionally include a payload 420, and response 412 may optionally include a payload 422. In certain example, optional payloads 420 and 422 may convey any suitable data, such as payload 420 may include data requesting a logfile and payload 422 may include the logfile.

In certain examples, request 410 and response 412 may be generated, verified and the like in any suitable manner. For example, control plane 402 and endpoint node 404 may perform the operations for request 410 and response 412 in a substantially similar manner as described above for other requests and responses. In an example, status 414 may be utilized by endpoint node 404 to convey a simple real-time status of request 410 being processed, and the status may be generated for human consumption. Status 414 may exist only on endpoint 404 and may only convey one of a limited number of simple states including, but not limited to, endpoint not ready to handle commands, endpoint ready to handle commands, endpoint processing command/percentage completed, command done and successfully completed, and command done with an error.

In an example, status 414 may display a terse or series of terse strings with details. In certain examples, status 414 may be used to give the user, such as user 140 of FIG. 1, real-time feedback on a request in-progress. For example, a user issuing request 410 remotely, such as from a network GUI, may monitor the progress or status 414 of such request. In another example, a user may provide request 410 locally from a box, such as a USB device, and status 414 may indicate to the user when to insert the device, whether the request is running, whether the request succeeded or failed, and when it is safe to remove the USB device.

Status 414 may be different from response 412 in any one of multiple reasons. For example, status 414 may be intended for different users, and data may go to different places or nodes. In an example, an IT individual may request logs from a local person via USB device. In this example, the logs, such as payload 422 in response 412, may be provided to the IT individual, but status 414 may be intended to let the person with the USB device know when to remove the device. In another example, status 414 may go back via a network, such as network 358 of FIG. 3. However, in the case of USB key, status 414 may go to a front panel display or LED, such as LED display 342 or 352 of FIG. 3. In an example where an endpoint could accept request locally via optical scanner/camera, such as optical scanner 332 or USB camera 354 of FIG. 3, status 414 may also go back via a display or LED. In this situation, endpoint 404 may have a single front panel status driver which both the USB and optical scan methods could use.

In certain examples, if status handling is shared amongst transport methods, the specifics could differ across different pieces of hardware. For example, one box or node may use a simple LED, where the other might use an alphanumeric display. In this example, the status driver may be generic across transports, but very platform specific. In an example, a timescale for response 412 and status 414 may be very different. For example, status 414 may be extremely real-time, and response 412 may occur over a longer time period. Additionally, status may be very ephemeral, and response 412 may require more durable handling. In different cases, neither response 412 nor status 414 may be absolutely required all the time.

While as described herein, a control plane has been used to describe a node issuing requests, and endpoint has been used to describe a node receiving and processing a request. These uses of control plane and endpoint may vary without varying from the scope of this disclosure. For example, while CP nodes 102, 104, and 106 may indeed receive and respond to requests. However, these may be different requests or different types of requests as compared to requests issued to endpoint nodes 108 and 110. In certain examples, operations described herein may be used to communicate amongst CP nodes 102, 104, and 106, and in a manner by which endpoint nodes 108 and 110 may make a request of CP node to issues applicable requests.

Figure 5:
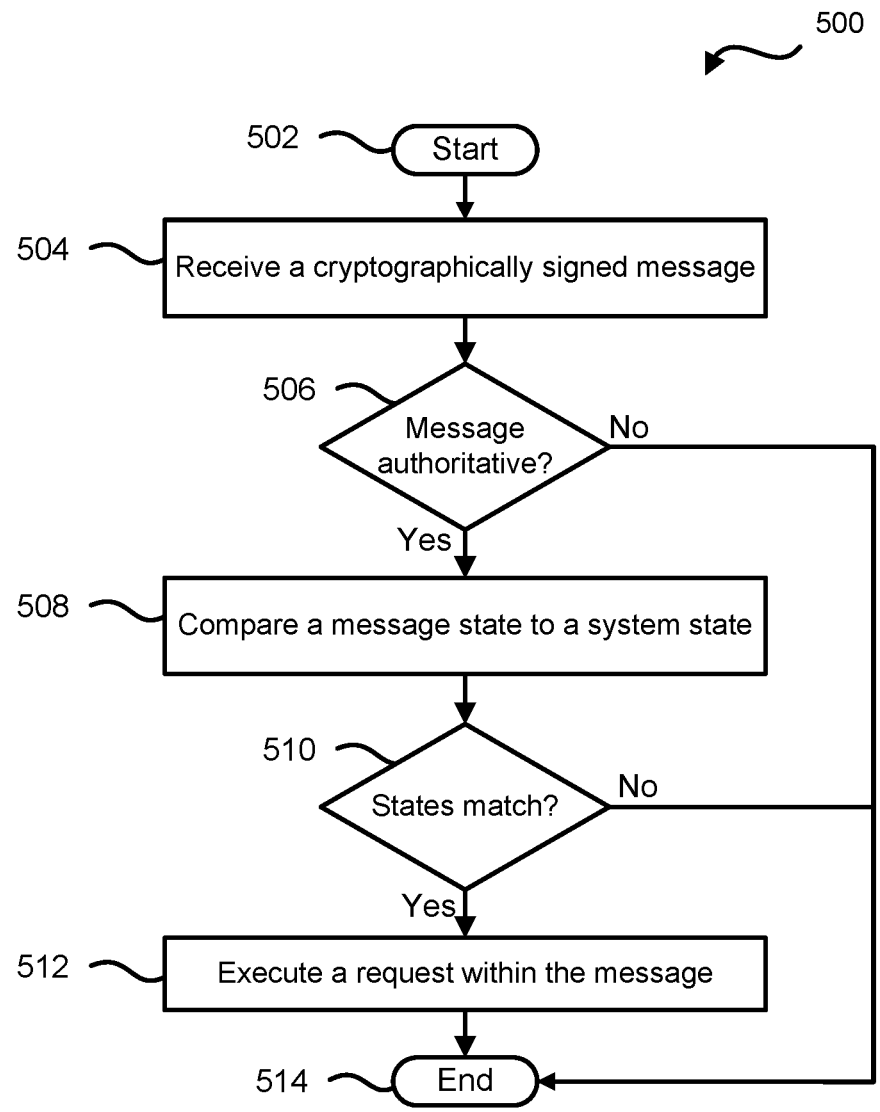
FIG. 5 is a flow diagram of a method for verifying a state of an authoritative message according to at least one embodiment of the present disclosure.

FIG. 5 illustrates a flow of a method 500 for verifying a state of an authoritative message according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure.

At block 504, a cryptographically signed message is received. In an example, the message may be received at any suitable node within a multiple node environment including, but not limited to, a control plane node and an endpoint node. In certain examples, the cryptographically signed message may be utilized to convey a request. The reception of a cryptographically signed message by via any suitable means. For example, these messages may be pulled by the endpoint node from a source node or may be pushed to the node by one of several operations. The one of the several operations may include, but is not limited to, a file being uploaded to the node, an electronic mail message being sent to the node, a humanly readable document being scanned or snapped by camera at the node, performing Optical Character Recognition at the node, scanning optically encoded media, such as QR or barcodes, conveyances via digital media, such as content on a USB drive, being inserted into the node, a message being received via radio transmission or other modems, a message being received via short-range wireless methods, a message being received via a general-purpose network protocol, and a message being received via a purpose-build network protocol made specifically for control plane operations.

At block 506, a determination is made whether the message is authoritative. In an example, the message may be deemed authoritative by any suitable manner, such as a string of certificates granting a requestor associated with the message authority to request a specific request including in the message. In certain examples, the string of certificates may be any suitable number of certificates with keys granting the permission from an owner down to the requestor. If the message is determined to be authoritative, the flow continues at block 508. Otherwise, the flow ends at block 514.

At block 508, a state described in the message is compared to a state of the node. In certain examples, the state of the message may be any suitable criterion associated with the message. For example, the state in the message may be a value to indicate a condition or state of the node the request is expecting to find. At block 510, a determination is made whether the state of the message matches the state of the node. In certain examples, the determination of whether the state of the message matches the state of the node may be performed in any suitable manner, such as those described above with respect to request or message 130 of FIG. 1.

If the state of the message does not match the state of the node, the flow ends at block 514. In an example, when the state of the message does not match the state of the node, particular conditions are not met, and the conditions should be resolved before continuing with the message. If the state of the message matches the state of the node, the request within the message is executed at block 512, and the flow ends at block 514.

As described herein, a control plane, including multiple control plane nodes 102, 104, and 106 in FIG. 1, may be created with an initial assumption that nodes are disaggregated, and communication between the nodes is limited. Thus, the control plane may be designed first and foremost to handle messaging in such situations. Additionally, the control plane may be created to support unreliable communication media and provide messages when there is no trusted connection or trusted node. For example, the control plane may be created with the assumption that the device, node or method of conveyance of a request message is untrusted.

While messaging herein has been mainly described as being unidirectional, the messages may contain a response without varying from the scope of this disclosure. For example, the control plane described herein may perform the messaging operations in an environment where a response or return status is not required. Additionally, the control plane may run or execute in an environment where back-and-forth communications may not be possible due to communications or media constraints in the environment, such as multiple node environment 100 of FIG. 1.

In certain examples, a message may have suffered considerable delays, and the control plane may be built specifically to accommodate a request message that may be invalid due to any factors. In an example, the factors may include, but are not limited to, circumstances, conditions and states that may have changed between the time of issuance of the message, and the last-known state of a system. The control plane may be designed to detect, remediate, and help limit problems caused by such factors. In certain examples, synchronization among nodes of users, roles, access permissions, or the like may be simplified though expression in certificates. In an example, the certificates may be shared and copied, through one of many simple conveyance operations or many possible media devices.

Figure 6:
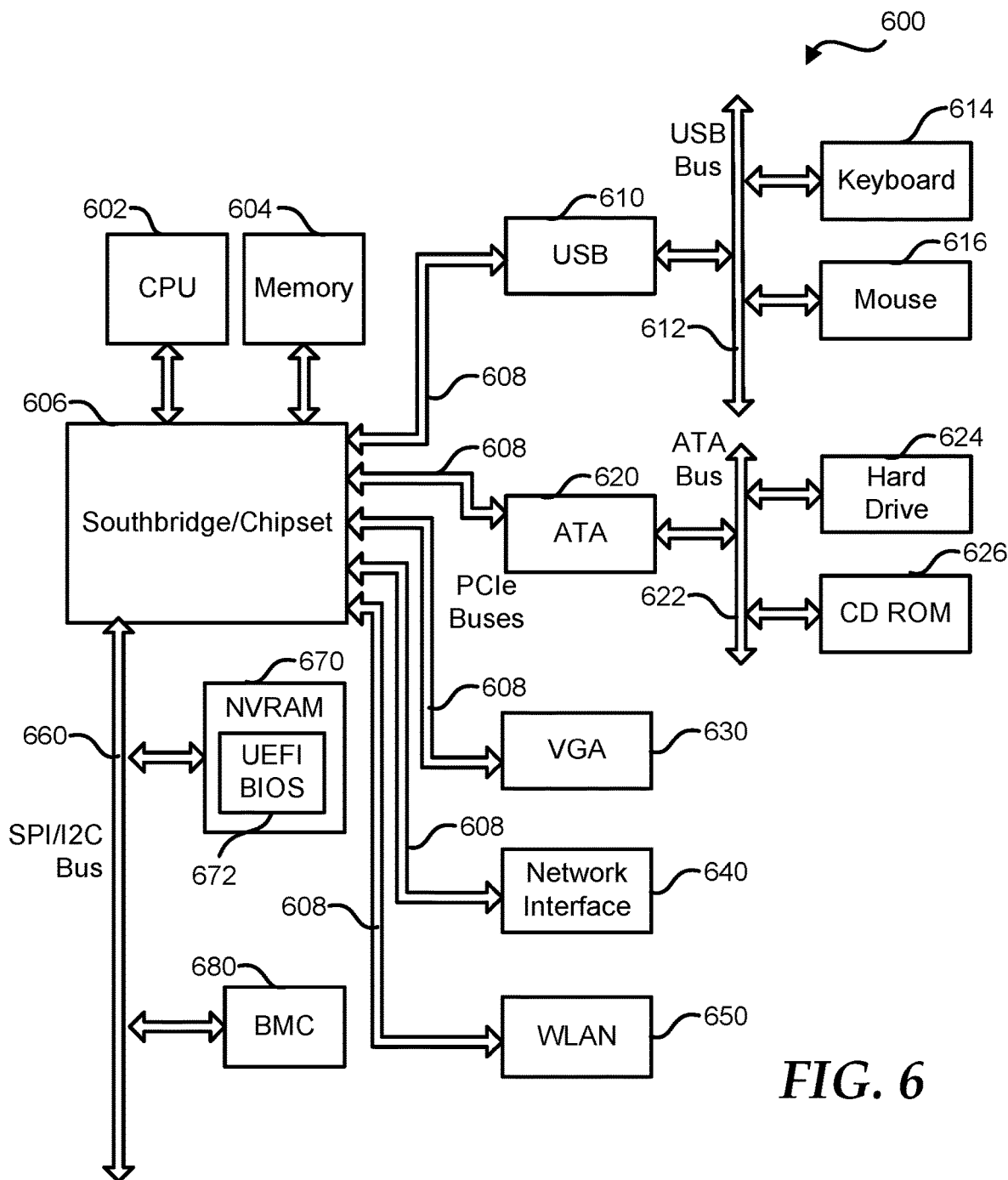
FIG. 6 is a block diagram of an information handling system according to an embodiment of the present disclosure.

FIG. 6 illustrates an information handling system 600 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 600 includes a processor 602, a memory 604, a chipset 606, a PCI bus 608, a universal serial bus (USB) controller 610, a USB 612, a keyboard device controller 614, a mouse device controller 616, a configuration database 618, an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a flash memory device 670 for storing UEFI BIOS code 672, a trusted platform module (TPM) 680, and a baseboard management controller (EC) 690. EC 690 can be referred to as a service processor, and embedded controller, and the like. Flash memory device 670 can be referred to as a SPI flash device, BIOS non-volatile random access memory (NVRAM), and the like. EC 690 is configured to provide out-of-band access to devices at information handling system 600. As used herein, out-of-band access herein refers to operations performed without support of CPU 602, such as prior to execution of UEFI BIOS code 672 by processor 602 to initialize operation of system 600. In an embodiment, system 600 can further include a platform security processor (PSP) 674 and/or a management engine (ME) 676. In particular, an x86 processor provided by AMD can include PSP 674, while ME 676 is typically associated with systems based on Intel x86 processors.

PSP 674 and ME 676 are processors that can operate independently of core processors at CPU 602, and that can execute firmware prior to the execution of the BIOS by a primary CPU core processor. PSP 674, included in recent AMD-based systems, is a microcontroller that includes dedicated read-only memory (ROM) and static random access memory (SRAM). PSP 674 is an isolated processor that runs independently from the main CPU processor cores. PSP 674 has access to firmware stored at flash memory device 670. During the earliest stages of initialization of system 600, PSP 674 is configured to authenticate the first block of BIOS code stored at flash memory device 670 before releasing the x86 processor from reset. Accordingly, PSP 674 provides a hardware root of trust for system 600. ME 676 provides similar functionality in Intel-based systems. In another embodiment, EC 690 can provide aspects of a hardware root of trust. The root of trust relates to software processes and/or hardware devices that ensure that firmware and other software necessary for operation of an information handling system is operating as expected.

Information handling system 600 can include additional components and additional busses, not shown for clarity. For example, system 600 can include multiple processor cores, audio devices, and the like. While a particular arrangement of bus technologies and interconnections is illustrated for the purpose of example, one of skill will appreciate that the techniques disclosed herein are applicable to other system architectures. System 600 can include multiple CPUs and redundant bus controllers. One or more components can be integrated together. For example, portions of chipset 606 can be integrated within CPU 602. In an embodiment, chipset 606 can include a platform controller hub (PCH). System 600 can include additional buses and bus protocols, for example I2C and the like. Additional components of information handling system 600 can include one or more storage devices that can store machine-executable code, one or more communications ports for communicating with external devices, and various input and output (I/O) devices, such as a keyboard, a mouse, and a video display.

For purposes of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

UEFI BIOS code 672 can be referred to as a firmware image, and the term BIOS is herein used interchangeably with the term firmware image, or simply firmware. In an embodiment, UEFI BIOS 672 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 600. While the techniques disclosed herein are described in the context of a UEFI compliant system, one of skill will appreciate that aspects of the disclosed systems and methods can be implemented at substantially any information handling system having configurable firmware.

UEFI BIOS code 672 includes instructions executable by CPU 602 to initialize and test the hardware components of system 600, and to load a boot loader or an operating system (OS) from a mass storage device. UEFI BIOS code 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

The storage capacity of SPI flash device 670 is typically limited to 32 MB or 64 MB of data. However, original equipment manufacturers (OEMs) of information handling systems may desire to provide advanced firmware capabilities, resulting in a BIOS image that is too large to fit in SPI flash device 670. Information handling system can include other non-volatile flash memory devices, in addition to SPI flash device 670. For example, memory 604 can include non-volatile memory devices in addition to dynamic random access memory devices. Such memory is referred to herein as non-volatile dual in-line memory module (NVDIMM) devices. In addition, hard drive 624 can include non-volatile storage elements, referred to as a solid-state drive (SSD). For still another example, information handling system 600 can include one or more non-volatile memory express (NVMe) devices. Techniques disclosed herein provide for storing a portion of a BIOS image at one or more non-volatile memory devices in addition to SPI flash device 670.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system of a multiple node environment, the information handling system comprising:
   a memory to store one or more variables associated with a state of the information handling system; and
   a processor in communication with the memory, the processor to:
      receive a first cryptographically signed message;
      receive a second cryptographically signed message after the first cryptographically signed message, wherein the second cryptographically signed message was transmitted prior to the first cryptographically signed message, wherein a source of the second cryptographically signed message is considered as an untrusted source within the multiple node environment, wherein the second cryptographically signed message includes a request having multiple states, the multiple states includes a first state;

based on the second cryptographically signed message being transmitted prior to the first cryptographically signed message, determine that the second cryptographically signed message is preempted by the first cryptographically signed message;

verify the second cryptographically signed message as an authoritative message;

in response to the second cryptographically signed message being verified as an authoritative message and based on the second cryptographically signed message being preempted, determine whether the multiple states described within the second cryptographically signed message match multiple current system states, wherein one of the current system states includes a current firmware version of the information handling system, wherein the first state includes a first firmware version in the second cryptographically signed messages; and in response to all of the multiple states described within the second cryptographically signed message matching all of the current system states:

determine that the first cryptographically signed message did not change any of the current system states associated with the multiple states described within the second cryptographically signed message;

execute the request associated with the second cryptographically signed message, wherein the state described within the second cryptographically signed message matches the current system state based on the first firmware version matching the current firmware version; and provide a real-time status of the request, wherein the information handling system is an endpoint of the multiple node environment.

2. The information handling system of claim 1, wherein the processor further to receive one or more certificates to synchronize different user roles and different user access permissions.

3. The information handling system of claim 1, wherein in response to the state being invalid, the processor further to:
provide error data in a response message, wherein the error data indicates that the state of the second cryptographically signed message was invalid.

4. The information handling system of claim 1, wherein the second cryptographically signed message includes one or more certificates signed with a public key of a trusted user.

5. The information handling system of claim 1, wherein the state identifies an expected specific global variable for the information handling system.

6. The information handling system of claim 1, wherein the second cryptographically signed message is sent from a second information handling system in the multiple node environment.

7. The information handling system of claim 6, wherein both the information handling system and the second information handling system are control plane nodes in the multiple node environment.

8. The information handling system of claim 1, wherein the multiple node environment is a disaggregated environment.

9. A method comprising:
receiving, at a first information handling system of a multiple node environment, a first cryptographically signed message;

receiving a second cryptographically signed message after the first cryptographically signed message, wherein the second cryptographically signed message was transmitted prior to the first cryptographically signed message, wherein a source of the second cryptographically signed message is considered as an untrusted source within the multiple node environment, wherein the second cryptographically signed message includes a request having multiple states, the multiple states includes a first state;

based on the second cryptographically signed message being transmitted prior to the first cryptographically signed message, determining that the second cryptographically signed message is preempted by the first cryptographically signed message;

verifying the second cryptographically signed message as an authoritative message;

in response to the second cryptographically signed message being verified as an authoritative message and based on the second cryptographically signed message being preempted, determining whether the multiple states described within the second cryptographically signed message match multiple current system states, wherein one of the current system states includes a current firmware version of the information handling system, wherein the first state includes a first firmware version in the second cryptographically signed messages; and in response to all of the multiple states described within the second cryptographically signed message matching all of the current system states:

determining that the first cryptographically signed message did not change any of the current system states associated with the multiple states described within the second cryptographically signed message;

executing the request associated with the second cryptographically signed message, wherein the state described within the second cryptographically signed message matches the current system state based on the first firmware version matching the current firmware version; and providing a real-time status of the request, wherein the information handling system is an endpoint of the multiple node environment.

10. The method of claim 9, further comprising providing one or more certificates to each node of the multiple node environment to synchronize different user roles and different user access permissions.

11. The method of claim 9, further comprising in response to the state being invalid, providing error data in a response message, wherein the error data indicates that the state described within the second cryptographically signed message was invalid.

12. The method of claim 9, wherein the second cryptographically signed message includes one or more certificates signed with a public key of a trusted user.

13. The method of claim 9, wherein the state identifies an expected specific global variable for the first information handling system.

14. The method of claim 9, wherein the second cryptographically signed message is sent from a second information handling system in the multiple node environment.

15. The method of claim 14, wherein both the first and second information handling systems are control plane nodes in the multiple node environment.

16. The method of claim 9, wherein the multiple node environment is a disaggregated environment.

17. A non-transitory computer-readable medium including code that when executed performs a method, the method comprising:
   receiving, at a first information handling system of a multiple node environment, a first cryptographically signed message;
   receiving a second cryptographically signed message after the first cryptographically signed message, wherein the second cryptographically signed message was transmitted prior to the first cryptographically signed message, wherein a source of the second cryptographically signed message is considered as an untrusted source within the multiple node environment, wherein the second cryptographically signed message includes a request having multiple states, the multiple states includes a first state;
   based on the second cryptographically signed message being transmitted prior to the first cryptographically signed message, determining that the second cryptographically signed message is preempted by the first cryptographically signed message;
   if the second cryptographically signed message is an authoritative message and based on the second cryptographically signed message being preempted, then determining whether the multiples states described within the second cryptographically signed message match multiple current system states, wherein one of the current system states includes a current firmware version of the information handling system, wherein the first state includes a first firmware version in the second cryptographically signed messages; and
   if all of the multiple states described within the second cryptographically signed message match all of the current system states, then:
      determining that the first cryptographically signed message did not change any of the current system states associated with the multiple states described within the second cryptographically signed message;
      executing the request associated with the second cryptographically signed message, wherein the state described within the second cryptographically signed message matches the current system state based on the first firmware version matching the current firmware version; and
      providing a real-time status of the request, wherein the information handling system is an endpoint of the multiple node environment.

18. The non-transitory computer-readable medium of claim 17, wherein the method further comprises providing one or more certificates to each node of the multiple node environment to synchronize different user roles and different user access permissions.

19. The non-transitory computer-readable medium of claim 17, wherein in response to the state being invalid, the method further comprises providing error data in a response message, wherein the error data indicates that the state of the second cryptographically signed message was invalid.

20. The non-transitory computer-readable medium of claim 17, wherein the state identifies an expected specific global variable for the first information handling system.

\* \* \* \* \*